2,959,591
RESERPINE-LIKE ESTERS OF PIVALIC ACID

Theodor Petrzilka, Bottmingen, Basel Land, Albert Frey, Riehen, near Basel, Albert Hofmann, Bottmingen, Basel Land, Hans Ott, Basel, Hansruedi Schenk, Binningen, Basel Land, and Franz Troxler, Basel, Switzerland, assignors to Sandoz Ltd., Basel, Switzerland No Drawing. Filed Jan. 16, 1959, Ser. No. 787,117

Claims priority, application Switzerland Jan. 30, 1958

9 Claims. (Cl. 260—287)

The present invention relates to new reserpine-like esters of pivalic acid. More particularly, the invention is concerned with new compounds having the general formula

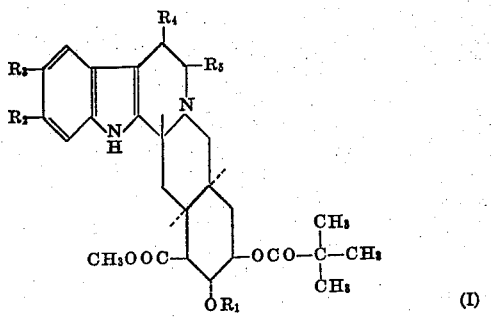

wherein $R_1$ is a lower alkyl group (e.g. methyl, ethyl, propyl, isopropyl, butyl, isobutyl, etc.), $R_2$ is a lower alkoxy group (e.g. methoxy, ethoxy, propoxy, isopropoxy, butoxy, isobutoxy, etc.) or a lower alkylmercapto group (e.g. methylmercapto, ethylmercapto, propylmercapto, ispropylmercapto, etc.), $R_3$ is a hydrogen atom or a methoxy group, and each of $R_4$ and $R_5$ is a hydrogen atom or a lower alkyl group (e.g. methyl, ethyl, propyl, isopropyl, butyl, isobutyl, etc.). These esters have valuable pharmacological properties and can be used as medicaments, e.g. as powerful sedative drugs.

Reserpine-like esters with a free hydroxyl group are disclosed in U.S. Patent No. 2,824,874; these esters exhibit a reserpine-like activity. Reserpine itself is characterized by a dual therapeutic personality: it lowers blood pressure and also exerts a tranquilizing effect.

It is a desideratum to provide a compound having the same mode of action as reserpine with respect to sedative action but being free of hypotensive effect, so that it can advantageously be used as a tranquilizer without involving a lowering of the blood pressure. The primary object of the present invention is to split the dual therapeutic effect of reserpine, so that a reserpine-like drug acting only or predominantly as a sedative is obtained. This object is achieved by the new reserpine-like esters of pivalic acid according to the present disclosure.

The novel esters of Formula I can be prepared by condensing substituted esters of deserpidic acid having the general formula

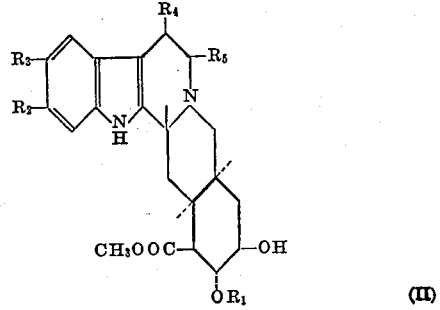

wherein each of $R_1$, $R_2$, $R_3$, $R_4$ and $R_5$ has the same significance as above, with a reactive derivative of pivalic acid, preferably a pivalic acid halide or the anhydride thereof.

Of the group of compounds of Formula II, only one ester of the lower aliphatic series was hitherto known, the reserpic acid methyl ester acetate described in the aforementioned U.S. patent. This compound markedly lowers blood pressure but has no sedative effect worth mentioning. It was not to be expected that the replacement of the acetyl group of said acetate by another acyl residue of the aliphatic series would effect a profound alteration of its pharmacodynamic character. The more surprising then is the fact that the compounds of the present invention and, particularly, reserpic acid methyl ester pivalate, are distinguished by a very strong sedative action besides having a mild hypotensive effect. Such a difference in kind could not be expected.

Upon comparison of the new pivalic acid esters of Formula I with reserpic acid methyl ester 3, 4, 5-trimethoxybenzoate (reserpine), with respect to their pharmacological properties, the blood pressure-lowering effect was markedly less pronounced, while they showed at least the same sedative effect as reserpine itself. Reserpic acid methyl ester pivalate, for example, when administered to the mouse at low dosage range, inhibits the spontaneous activity twice as much as does reserpine (determination in the jiggling cage):

PERCENTAGE INHIBITION OF THE SPONTANEOUS ACTIVITY

|  | 0.2 | 0.5 | 1.0 mg./kg. s.c. |
|---|---|---|---|
| Reserpine_____percent__ | 39 | 45 | 94 |
| Reserpic acid methyl pivalate percent__ | 85 | 96 | 97 |

Furthermore, the esters of pivalic acid are distinguished by a shorter duration of activity, which makes it possible to regulate their therapeutic effect more easily, compared to reserpine.

As to the chemical point of view, the new esters of pivalic acid are characterized by the fact that their saponification is very difficult to achieve. This remarkable stability to hydrolysis gives them a special position apart from the other hitherto-known reserpine-like compounds. This particular property depends on the teritary carbon atom of the acyl residue, which produces a strong shielding effect around the ester-bond at the 18-position. The new esters of Formula I are, at room temperature, well crystallized substances; they form stable, solid salts with therapeutically acceptable inorganic or organic acids. These acids may be quite diverse in character; thus, for example, with hydrochloric, hydrobromic, phosphoric, acetic, benzoic, tartaric, citric, methanesulfonic acid, etc., the corresponding hydrochloride, hydrobromide, phosphate, acetate, benzoate, tartrate, citrate, methanesulfonate, etc., respectively, is obtained.

The new compounds of the present invention are thus useful where an effective sedation is desired without significant or only mild concomitant action on the blood pressure. Administration may, for example, by effected perorally by way of tablets or the like, and in other suitable manner.

The hydroxy-esters of Formula II, which are used as starting material for the present invention, are described in the U.S. patent application Serial Number 728,112.

The examples which follow illustrate the invention in greater detail by way of presently preferred embodiments, but it is to be understood that the invention is not limited thereto. In these examples, parts by weight bear the same relation to parts by volume as do grams to milliliters. Temperatures are expressed in degrees centigrade; melting points are uncorrected.

*Example 1.—Reserpic acid methyl ester pivalate*

0.207 part by weight of reserpic acid methyl ester is dissolved in 2 parts by volume of pyridine and, after addition of 0.15 part by volume of pivalic acid chloride, the solution is set aside at room temperature for 16 hours. It is then treated with 1 part by volume of water and kept at room temperature for 30 minutes, whereupon the solution is diluted with chloroform; the chloroform is successively extracted with dilute hydrochloric acid and sodium hydrogen carbonate solution. The pale yellow residue gives the pivalate of reserpic acid methylester from methylene chloride in needles; M.P. 250–252°, $[\alpha]_D^{20}=-93°$ (c.=0.2 in pyridine).

*Example 2.—11-ethoxy-deserpidic acid methyl ester pivalate*

To a solution of 0.550 part by weight of 11-ethoxy deserpidic acid methyl ester in 5 parts by volume of pyridine is added 0.5 part by volume of pivalic acid chloride and the solution is kept at room temperature for 16 hours. After that 2 parts by volume of water are added and the solution is kept at room temperature for another 30 minutes. It is then diluted with chloroform and the chloroform is successively extracted with dilute hydrochloric acid and sodium hydrogen carbonate solution. The crude reaction product is chromatographed on aluminum oxide. The pivalate crystallizes from ether in needles; M.P. 193–195°, $[\alpha]_D=-92°$ (c.=0.2 in pyridine).

*Example 3.—17-desmethoxy-17-isopropoxy reserpic acid methyl ester pivalate*

To a solution of 0.780 part by weight of 17-desmethoxy-17-isopropoxy reserpic acid methyl ester in 7 parts by volume of pyridine is added 0.7 part by volume of pivalic acid chloride and the solution is kept at room temperature for 17 hours. After that it is worked up as described in Example 2. The pivalate crystallizes from ether/petroleum ether in prisms; M.P. 228–230°, $[\alpha]_D=-69°$ (c.=0.2 in pyridine).

*Example 4.—10,11-dimethoxy deserpidic acid methyl ester pivalate*

To a solution of 0.465 part by weight of 10,11-dimethoxy deserpidic acid methyl ester in 10 parts by volume of pyridine is added 0.55 part by volume of pivalic acid chloride and the solution is kept at room temperature for 6 days. It is then worked up as described in Example 2. The pivalate crystallizes from methanol in needles; M.P. 270–271°, $[\alpha]_D=-103°$ (c.=0.2 in pyridine).

*Example 5.—11-ethylmercapto deserpidic acid methyl ester pivalate*

To a solution of 0.380 part by weight of 11-ethylmercapto deserpidic acid methyl ester in 3.5 parts by volume of pyridine is added 0.3 part by volume of pivalic acid chloride and the solution is kept at room temperature for 20 hours. It is then worked up as described in Example 2. The pivalate crystallizes from ether/petroleum ether in needles; M.P. 215–218°, $[\alpha]_D=-87°$ (c.=0.2 in pyridine).

*Example 6.—(-),(l)-5-methyl reserpic acid methyl ester pivalate*

To a solution of 0.300 part by weight of (-),(l)-5-methyl reserpic acid methyl ester in 7 parts by volume of pyridine is added 0.35 part by volume of pivalic acid chloride and the solution is kept at room temperature for 2 days. It is then worked up as described in Example 2. The pivalate crystallizes from ether/hexane in prisms; M.P. 249–251°, $[\alpha]_D=-83°$ (c.=0.2 in pyridine).

*Example 7.—11-ethoxy-17-desmethoxy-17-isopropoxy deserpidic acid methyl ester pivalate*

To a solution of 0.430 part by weight of 11-ethoxy-17-desmethoxy-17-isopropoxy deserpidic acid methyl ester in 4.5 parts by volume of pyridine is added 0.4 part by volume of pivalic acid chloride and the solution is allowed to stand at room temperature for 18 hours. It is then worked up as described in Example 2. The pivalate crystallizes from ether/petroleum ether in needles; M.P. 193–195°, $[\alpha]_D=-73°$ (c.=0.2 in pyridine).

*Example 8.—(-),(d)-6-methyl-reserpic acid methyl ester pivalate*

To a solution of 0.310 part by weight of (-),(d)-6-methyl reserpic acid methyl ester in 3 parts by volume of pyridine is added 0.33 part by volume of pivalic acid chloride and the solution is allowed to stand at room temperature for 24 hours. It is then worked up as described in Example 2. The pivalate crystallizes from ether in prisms; M.P. 250–251°, $[\alpha]_D=-68°$ (c.=0.2 in pyridine).

The starting materials for the last two examples: 11-ethoxy - 17 - desmethoxy - 17 - isopropoxy deserpidic acid methyl ester and (-),(d)-6-methyl reserpic acid methyl ester are prepared as follows:

1 part of decahydro-2-isopropoxy-3,5-oxido-6-bromo-7-oxo-8-hydroxy-1-naphthoic acid lactone [prepared according to J. Am. Chem. Soc., 78, 2023 (1956)] is suspended in 25 parts by volume of acetic anhydride and stirred at 40° for 5 minutes with 1 part of zinc dust, whereby the bromoketone dissolves and 1,2,3,4,7,8,9,10-octahydro-2-isopropoxy-3-acetoxy-7-oxo-1-naphthoic acid of the formula

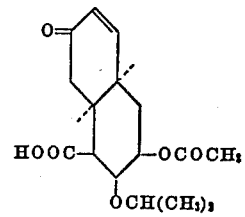

is obtained.

The racemic acetoxy-acid of the above formula is first resolved into the optical antipodes via the brucine salt. The levorotatory antipode cristallises as prisms from ethyl acetate; M.P. 218–220°, $[\alpha]_D=-188°$ (c.=0.2 in ethanol).

By oxidation of the (-)-acetoxy-acid with periodic acid or sodium periodate in the presence of a mere catalytic amount of osmium tetroxide there is formed, via the diol, the corresponding aldehyde-dicarboxylic acid which is directly converted with diazomethane into the dimethyl ester and condensed with 11-ethoxy-tryptamine. Reduction of the Schiff's base produced with sodium boron hydride and saponification of the reduction product with methanolic sodium hydroxide solution yields the tetracyclic lactam of the formula

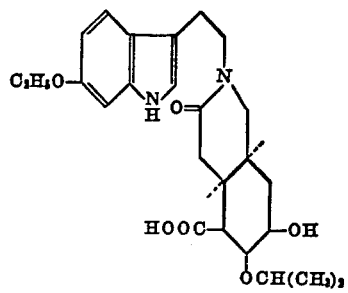

The lactam crystallises from acetone-ether as prisms of

M.P. 140–142°, [α]_D=53° (c.=0.2 in pyridine). The lactam is now warmed with acetic anhydride and sodium acetate whereby lactonization occurs with formation of the corresponding lactone-lactam.

The amorphous lactam is cyclised with phosphorus oxychloride to 11-ethoxy-17-desmethoxy-17-isopropoxy-3-dehydro-deserpidic acid lactone of the formula

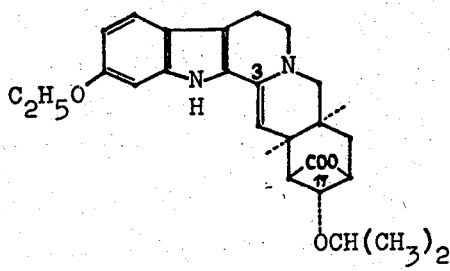

The compound crystallises from methanol as leaflets of M.P. 216–218°; [α]_D=120° (c.=0.2 in pyridine).

The 3-dehydro-lactone is reduced to 11-ethoxy-17-desmethoxy-17-isopropoxy-isodeserpidic acid lactone by treatment with sodium boron hydride or catalytically activated hydrogen. The iso-lactone melts at 123–125°, needles from methanol; [α]_D=—126° (c.=0.2 in pyridine). When the iso-lactone is dissolved in xylene and boiled with pivalic acid, rearrangement occurs to give 11-ethoxy-17-desmethoxy-17-isopropoxy-deserpidic acid lactone, which crystallises from methanol as prisms of M.P. 195–200°.

This compound yields on methanolysis, e.g. by heating under reflux with sodium methylate and methanol, the desired 11-ethoxy-17-desmethoxy - 17 - isopropoxy-deserpidic acid methyl ester.

1 part of decahydro-2-methoxy-3,5-oxido - 6 - bromo-7-oxo-8-hydroxy-1-naphthoic acid lactone (prepared according to J. Am. Chem. Soc., 78, 2023 [1956]) is suspended in 25 parts by volume of acetic anhydride and stirred at 40° for 5 minutes with 1 part of zinc dust, whereby the bromoketone dissolves and 1,2,3,4,7,8,9,10-octahydro-2-methoxy-3-acetoxy-7-oxo - 1 - naphthoic acid of the formula

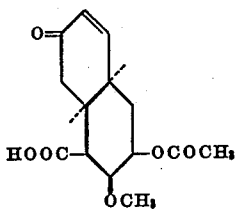

is obtained. M.P. 210–215° after crystallisation from acetone-ether. The racemic acetoxy-acid of the above formula is first resolved into the optical antipodes via the strychnine salt. The levorotatory antipode crystallises as strong refractory plates from methanol; M.P. 223–225°, [α]_D=—219° (c.=0.2 in ethanol).

By oxidation of the (-)-acetoxy-acid with periodic acid or sodium periodate in the presence of a mere catalytic amount of osmium tetroxide there is formed, via the diol, the corresponding aldehyde-dicarboxylic acid which is directly converted with diazomethane into the dimethyl ester and condensed with 6-methoxy-β-methyl-tryptamine. Reduction of the produced Schiff's base with sodium boron hydride and saponification of the reduction product with methanolic sodium hydroxide solution yields the tetracyclic (-),(d,l)-lactam of the formula

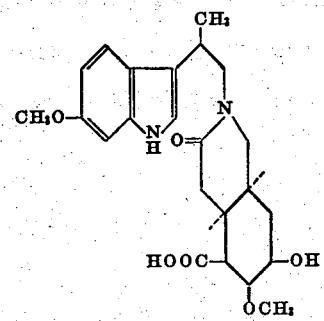

The amorphous lactam of the above formula is now warmed with acetic anhydride and sodium acetate, whereby lactonization occurs with formation of the corresponding (-), (d,l)-lactone-lactam.

The amorphous lactone-lactam is cyclised with phosphorus oxychloride to (-),(d,l)-6-methyl-3-dehydro-reserpic acid lactone of the formula

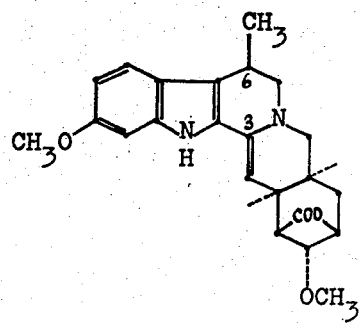

The compound crystallises from methanol as needles of M.P. 236–239°, [α]_D=46° (c.=0.2 in pyridine). The 3-dehydro-lactone is reduced to (-),(d,l) - 6 - methyl-isoreserpic acid lactone by treatment with sodium boron hydride or catalytically activated hydrogen. When the amorphous iso-lactone is dissolved in xylene and boiled with pivalic acid, rearrangement occurs to give (-),(d,l)-6-methyl-reserpic acid lactone, which is resolved by chromatography on alumina into (-),(d)- and (-),(l)-6-methyl-reserpic acid lactone; (-),(d)-6-methyl-reserpic acid lactone crystallises from methanol as prisms of M.P. 256–258°, [α]_D=81° (c.=0.2 in pyridine). This compound yields on methanolysis the desired (-),(d)-6-methyl-reserpic acid methyl ester.

Having thus disclosed the invention, what is claimed is:

1. A compound having the following formula

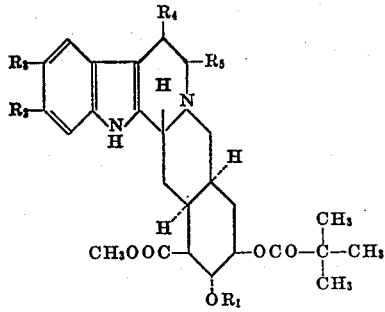

and therapeutically acceptable salts thereof with acids, wherein $R_1$ is a lower alkyl group, $R_2$ is a member selected from the group consisting of lower alkoxy and lower alkylmercapto, $R_3$ is a member selected from the group consisting of hydrogen and methoxy, and each of $R_4$ and $R_5$ is selected from the group consisting of hydrogen and lower alkyl.

2. Reserpic acid methyl ester pivalate.
3. 11-ethoxy-deserpidic acid methyl ester pivalate.

4. 17-desmethoxy-17-isopropoxy-reserpic acid methyl ester pivalate.

5. 10,11 - dimethoxy - deserpidic acid methyl ester pivalate.

6. 11 - ethylmercapto - deserpidic acid methyl ester pivalate.

7. (-),(l)-5-methyl-reserpic acid methyl ester pivalate.

8. 11-ethoxy - 17 - desmethoxy - 17 - isopropoxy - deserpidic acid methyl ester pivalate.

9. (-),(d)-6-methyl-reserpic acid methyl ester pivalate.

No references cited.

Notice of Adverse Decision in Interference

In Interference No. 91,636 involving Patent No. 2,959,591, T. Petrzilka, A. Frey, A. Hofmann, H. Otto, H. Schenk, and F. Troxler, Reserpine-like esters of pivalic acid, final decision adverse to the patentees was rendered Apr. 12, 1963, as to claim 2.

[*Official Gazette August 20, 1963.*]